United States Patent Office 2,944,978
Patented July 12, 1960

2,944,978
PROCESS FOR BREAKING EMULSIONS OF THE OIL-IN-WATER CLASS

Louis T. Monson, La Puente, and Fred W. Jenkins, Los Angeles, Calif., assignors to Petrolite Corporation, Los Angeles, Calif., a corporation of Delaware No Drawing. Filed July 29, 1957, Ser. No. 674,600

10 Claims. (Cl. 252—342)

This invention relates to a process for resolving or separating emulsions of the oil-in-water class, by subjecting the emulsion to the action of certain chemical reagents.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: certain oil-refinery emulsions, in which a petroleum distillate occurs as a dispersion in water; steam cylinder emulsions, in which traces of lubricating oil are found dispersed in condensed steam from steam engines and steam pumps; wax-hexane-water emulsions, encountered in de-waxing operations in oil refining; butadiene tar-in-water emulsions, in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions, in synthetic rubber plants; synthetic latex-in-water emulsions, in plants producing co-polymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsion paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficultly recoverable.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced, contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from about 20% down to a few parts per million. Emulsions containing more than about 20% of dispersed phase are commonly of such stability as to be less responsive to the presently disclosed reagents, possibly because of the appreciable content of emulsifying agent present in such systems, whether intentionally incorporated for the purpose of stabilizing them, or not.

Although the present invention relates to emulsions containing as much as about 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists, and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures, in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown; and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to about 20% are herein included, as stated above.

The process which constitutes the present invention consists in subjecting an emulsion of the oil-in-water class to the action of a reagent or demulsifier of the kind subsequently described, thereby causing the oil particles in the emulsion to coalesce sufficiently to rise to the surface of the non-oily layer (or settle to the bottom, if the oil density is greater), when the mixture is allowed to stand in the quiescent state after treatment with the reagent or demulsifier.

Applicability of the present process can be readily determined by direct trial on any emulsion, without reference to theoretical considerations. This fact facilitates its application to naturally-occuring emulsions, and to emulsions accidentally, unintentionally, or unavoidably produced; since no laboratory experimentation, to discover the nature of the emulsion components or of the emulsifying agent, is required.

The reagent employed as the demulsifier in any application of our present process includes an ester of a polycarboxy acid and a high-molal non-ionic surfactant, which surfactant is a water-dispersible oxyalkylated derivative of an oxyalkylation-susceptible starting material. The parent oxyalkylated materials, the use of whose esters is herein described and claimed, are described and their use is claimed in our co-pending application Serial No. 643,542, filed March 4, 1957.

The present application is a continuation-in-part of said co-pending application, which latter is concerned with a process for breaking an emulsion comprising an oil dispersed in a non-oily continuous phase, in which the dispersed phase is not greater than about 20%, characterized by subjecting the emulsion to the action of a reagent which includes a high-molal non-ionic surfactant which is an oxyalkylated derivative of an oxyalkylation-susceptible starting material, the molecular weight of the oxyalkylated derivative being within the range of about 1,000 to about 10,000.

Within this broad class of oxyalkylated starting materials suitable for producing the present esters we have found several sub-genera to be especially useful for our purpose. One such sub-genus includes that portion of the whole class whose molecule contains at least one radical having 8 or more carbon atoms in a single group, i.e., it has a concentrated or localized hydrophobic influence in the molecule.

It is to the use of esters of this sub-genus of oxyalkylated starting materials that the present application is particularly directed. More specifically, the oxyalkylated starting material is an oxyalkylated 2,4,6 $C_4$-to-$C_{14}$-hydrocarbon-substituted monocyclic phenol-$C_1$-to-$C_8$ aldehyde resin, whose oxyalkylene groups are selected from the class consisting of oxyethylene and oxypropylene groups. Said sub-genus is claimed in claims 3–10 inclusive of said co-pending application, Serial No. 643,542.

The reagents employed by us in practising our process must be sufficiently water-dispersible under the conditions of use as to be miscible with the external phase of the emulsions which are to be resolved. All such emulsions are of the oil-in-water class; and hence they have water, some aqueous liquid, or at least some non-oily liquid as such external phase. Miscibility of the reagent with such phase, in the proportions required, is important if the reagent is to distribute itself throughout the emulsion in such manner as to resolve the latter.

Our present reagents are esters of starting materials which are, in turn, all high-molal oxyalkylated derivatives of oxyalkylation-susceptible materials, as mentioned above. Oxyalkylated products are derivable from starting materials containing at least one labile hydrogen atom, that is, a hydrogen atom activated by the fact that it is attached to an atom of either oxygen, nitrogen or sulfur. Alcohols, carboxylic acids, phenols, amines, amides, mercaptans, are all examples of oxyalkylation-susceptible starting materials; and the products prepared from them by an oxyalkylation reaction are oxyalkylated derivatives of them.

Oxyalkylation is a well-known reaction. Ordinarily, it is achieved by reacting an oxyalkylation-susceptible starting material with an alkylene oxide like ethylene oxide, propylene oxide, butylene oxide, glycid, or methylglycid, or a carbonate of such an alkylene oxide. The free oxides are less expensive and more reactive than the carbonate forms, and hence are conventionally employed in the preparation of oxyalkylated derivatives of many oxyalkylation-susceptible starting materials. The oxyalkylation reaction using the alkylene oxides is a beautifully simple one to conduct, consisting merely in the introduction of the oxide into the starting material in presence of an alkaline catalyst (or, if the starting material is sufficiently basic, in absence of catalyst). Where large proportions of oxyalkylene radicals are to be so introduced into the starting material, a catalyst is ordinarily employed. In the oxyalkylation reaction, the oxyalkylene residue, or multiples thereof, is introduced into the starting material between the reactive or labile hydrogen atom and the adjoining oxygen, nitrogen or sulfur atom. The chain of oxyalkylene residues may be a very long one, including tens and even hundreds of recurrences of the bivalent alkylene oxide radical, —AlkO—.

The composition of such oxyalkylated derivatives is not so easily determined. Obviously, especially when the starting material includes more than one labile hydrogen atom, the reaction product is not a single compound of determinable and describable structure; it is a co-generic mixture of oxyalkylated derivatives containing alkylene oxide residue groups or chains of various sizes (that is, polyoxyalkylene radicals composed of different numbers of alkylene oxide residues). The composition of oxyalkylated derivatives is therefore to be described in terms of their process of manufacture, as above.

Examples of oxyalkylated starting materials suitable for preparing the present esters are recited in our co-pending application, Serial No. 643,542. Additional examples are to be found in U.S. Patents Nos. 2,499,367, -368, and -370, all dated March 7, 1950, and all to De Groote. The extensive descriptions of oxyalkylated derivatives of alkylphenol-aldehyde resins there recited are incorporated herein by reference.

All of our reagents are described as "high-molal," in that they have theoretical molecular weights of from about 1,000 upward to about 10,000 or even greater. They are thereby distinguished from the large mass of surfactants. Simple soaps, the first widely-used and still the most widely-known class of surfactants, have molecular weights of the order of 300. Synthetic anionic detergents like keryl benzene sulfonates are surfactants; but their molecular weights are not greater than about 350–400. Dinonylnaphthalene sulfonates have molecular weights less than 500. Cationic surfactants like cetylpyridinium bromide and benzyltriethylammonium chloride have molecular weights less than about 400.

Our esters may be advantageously prepared from the above-recited oxyalkylated derivatives, in which the molecule contains at least one occurrence of a radical having at least 8 carbon atoms in a single group, and a polycarboxy acid. Although one may use tricarboxy acids such as citric or tricarballylic to prepare our ester reagents, it is our preference to use a dicarboxy acid or anhydride, like oxalic acid, maleic acid or anhydride, tartaric acid, citraconic acid, phthalic acid or anhydride, adipic acid, succinic acid, azelaic acid, sebacic acid, diglycolic acid, adduct acids of the diene or Clocker type (see Clocker, U.S. Patents Nos. 2,188,882–90), and especially such adduct acids having 8 carbon atoms or less. Polycarboxy acids having more than 8 carbon atoms may be used, such as dimerized abietic acid, dimerized fatty acids obtained from diene acids and their esters, adduct acids obtained from terpenes and either maleic or citraconic acid or their anhydrides. One may also use adduct acids of the type prepared by reaction between maleic anhydride, citraconic anhydride, or diglycolic acid, and butadiene or cyclopentadiene. Oxalic acid tends to decompose and is not quite as satisfactory as some of the other acids in the same price range, which are both cheap and heat-resistant. Halogenated polycarboxy acids which retain the polycarboxy function are usable reactants here.

Where the oxyalkylated starting material used in the esterification process to produce our reagents possesses only one OH group, the product may be an acidic ester containing the residues of one molecule of each kind of reactant, or a neutral ester containing the residues of one molecule of dicarboxy acid and 2 molecules of oxyalkylated derivative. Where the parent oxyalkylated derivative contains more than one OH group, it is obvious that polyesters will result on continued reaction; and that such poly-esters may be either neutral or acidic, depending on the nature of their terminal groups. In turn, that is determined largely by the proportions of reactants employed.

We prefer to use the acidic fractional esters of this kind, as demulsifiers in our process. Accordingly, we prefer that the esters be prepared using a stoichiometric excess of the polycarboxy acid, over what would be required to produce a neutral ester.

U.S. Patent No. 2,766,213, dated October 9, 1956, to Dickson, describes reagents of this class of esters which we find useful as demulsifiers for some oil-in-water emulsions. That description is incorporated hereby by reference. Although the Dickson reagents are known to be useful in petroleum-emulsion-resolution processes, it should be clearly stated that their use to date has been restricted to the resolution of water-in-oil class petroleum emulsions, only. There is no disclosure in the Dickson patent that the same class of reagents would be suitable for resolving oil-in-water class emulsions of petroleum or of any other oily liquid. Furthermore, although we have used reagents of the Dickson kind for some time, to demulsify petroleum emulsions of the water-in-oil class, we have only recently discovered their applicability in our present process, for resolving oil-in-water class emulsions.

The following examples are representative of our present ester reagents:

Example 1

Commercial formaldehyde (37%), 225 pounds, is slowly introduced into a mixture of 585 pounds of aromatic petroleum solvent, 401 pounds of secondary butylphenol, and 14 pounds of 66° sulfuric acid, with stirring, the temperature being so maintained as to produce a constant evolution of water of solution and of reaction.

Heating is continued at about 150° C. till there is no further evolution of water. To the resin mass so produced is added aqueous caustic soda containing 13 pounds of NaOH. The mass is heated to drive off the water of solution. Any petroleum solvent distilled during these operations is returned to the vessel. Thereafter, with the reaction vessel at approximately 150° C., 706 pounds of ethylene oxide are slowly introduced in small increments and reacted, reaction pressure being maintained below about 20 p.s.i.g. Then, to the mass, 776 pounds of propylene oxide are similarly introduced and reacted. Then, 1,000 parts by weight of the product so prepared are placed in a vessel equipped with heating and stirring facilities; and the temperature is raised to about 100° C. At this point, 45 parts by weight of maleic anhydride are introduced, in small increments and with stirring, meantime raising the temperature slowly to about 150° C. The mass is stirred at this latter temperature for 2 hours. The product is an effective oil-in-water demulsifier.

Example 2

Example 1 is repeated, except that paratertiary amylphenol is substituted for the butylphenol there employed; and the amounts of reactants used are 571 pounds of aromatic petroleum solvent, 417 pounds of amylphenol, 12 pounds of sulfuric acid, 214 pounds of formaldehyde, 13 pounds of NaOH, 671 pounds of ethylene oxide, and 737 pounds of propylene oxide. After completion of the reaction with propylene oxide, 250 pounds of aromatic solvent are added, and the mass is stirred until homogeneous. To 1,000 parts by weight of the above intermediate, introduce 75 parts by weight of phthalic anhydride, in small increments and with stirring, starting the addition at about 100° C. and slowly raising the temperature of the reaction vessel to about 200° C. Stir the reaction mass for 2 hours at this temperature. The product is an effective demulsifier for oil-in-water emulsions.

Example 3

Commerial formaldehyde (37%), 252 pounds, is slowly added to a mixture of 481 pounds of aromatic petroleum solvent, 511 pounds of paratertiary amylphenol, and 8 pounds of 66° sulfuric acid, with stirring, the temeprature being so maintained as to produce a constant evolution of water of solution and of reaction. Heating at about 150° C. is continued until there is no further evolution of water. To the resin mass so produced are added 10 pounds of NaOH, in the form of an aqueous solution. The mass is heated to drive off the water of solution. Any petroleum solvent distilled during these operations is returned to the mass; and a second portion of 157 pounds of solvent is added, to reduce the viscosity of the mass. Thereafter, with the reaction vessel at approximately 150° C., 329 pounds of ethylene oxide are slowly introduced in small increments, and reacted, reaction pressure being maintained below about 20 p.s.i.g. Then, 700 pounds more of aromatic petroleum solvent are added, and the mass is stirred until homogeneous. Introduce 1,000 parts by weight of this product into a processing vessel equipped with stirring and heating facilities, and add 30 parts by weight of maleic anhydride, in small increments and with stirring, starting the addition at about 100° C. and slowly raising the temperature to about 150° C. Stir the mass at this latter temperature for 2 hours. The product is an effective oil-in-water demulsifier.

Example 4

Example 3 is repeated, except that secondary butylphenol is substituted for the paratertiary amylphenol there employed; and the amounts of reactants used are 488 pounds of aromatic petroleum solvent (in the first addition thereof), 501 pounds of butylphenol, 11 pounds of sulfuric acid, 271 pounds of formaldehyde, 11 pounds of NaOH, 160 pounds of solvent (in the second addition thereof), 294 pounds of ethylene oxide, and 629 pounds of solvent (in the third addition therof). Introduce 1,000 parts by weight of this product into a processing vessel equipped with stirring and heating facilities, and add 45 parts by weight of maleic anhydride, in small increments and with stirring, starting the addition at about 100° C. and slowly raising the temperature to about 150° C. Stir the mass at this latter temperature for 2 hours. The product is an effective oil-in-water demulsifier.

Example 5

Example 3 is repeated, except that 685 pounds of para nonylphenol are substituted for the 511 pounds of amylphenol there used, and 441 pounds of ethylene oxide are used instead of 329 pounds. Otherwise, the procedure is as there recited. Introduce 1,000 parts by weight of this product into a processing vessel equipped with stirring and heating facilities, and add 89 parts by weight of succinic anhydride, in small increments and with stirring, starting the addition at about 100° C. and slowly raising the temperature to about 175° C. Stir the mass at this latter temperature for 2 hours. The product is an effective oil-in-water demulsifier.

Example 6

Commercial formaldehyde (37%), 271 pounds, is slowly added to a mixture of 488 pounds of aromatic petroleum solvent, 502 pounds of secondary butylphenol, and 10 pounds of 66° sulfuric acid, with stirring, the temperature being so maintained as to produce a constant evolution of water of solution and of reaction. Heating at about 150° C. is continued until there is no further evolution of water. To the resin mass so produced are added 793 pounds more of aromatic solvent, and 11 pounds of NaOH in aqueous solution. The water of solution is thereafter distilled from the mass. To 648 pounds of the resin solution so prepared is added 157 pounds more of aromatic solvent and 14 pounds of NaOH in aqueous solution; and the water so added is distilled from the mass. Then 4776 pounds of propylene oxide are slowly introduced in small increments, and reacted, reaction temperature being about 150° C., and reaction pressure not exceeding about 20 p.s.i.g. Thereafter, 625 pounds of ethylene oxide are slowly introduced in small increments and reacted, under the same reaction conditions. Introduce 1,000 parts by weight of this product into a processing vessel equipped with stirring and heating facilities, and add 110 parts by weight of tartaric acid, in small increments and with stirring, starting the addition at about 100° C. and slowly raising the temperature to about 200° C. Stir the mass at this latter temperature for 2 hours. The product is an effective oil-in-water demulsifier.

Example 7

Commercial formaldehyde (37%), 265 pounds, is slowly introduced into a mixture of 526 pounds of aromatic petroleum solvent, 446 pounds of paratertiary amylphenol, and 28 pounds of sodium hydroxide, with stirring, the temperature being so maintained as to produce a constant evolution of water of solution and of reaction. Heating is continued at 150° C. till there is no further evolution of water. Any solvent distilled in the process is returned to the vesssel. To the resin mass so produced, 952 pounds of propylene oxide are slowly added in small increments, and reacted, using a reaction temperature of approximately 150° C. Reaction pressure is maintained below about 20 p.s.i.g. After the propylene oxide has been completely reacted, 469 pounds more of petroleum solvent are added to reduce the viscosity of the product. Introduce 1,000 parts by weight of this product into a processing vessel equipped with stirring and heating facilities, and add 100 parts by weight of diglycolic acid, in small increments and with stirring, starting the addition at about 125° C. and slowly raising the temperature to about 225° C. Stir the mass at this latter temperature for 1 hour. The product is a quite viscous liquid which is an effective oil-in-water demulsifier.

Example 8

Commercial formaldehyde (37%), 158 pounds, is slowly introduced into a mixture of 700 pounds of aromatic petroleum solvent, 294 pounds of paratertiary amylphenol, and 6 pounds of 66° sulfuric acid, with stirring, the temperature being so maintained as to produce a constant evolution of water of solution and of reaction. Heating is continued at 150° C. till there is no further evolution of water. To the resin so produced is added aqueous caustic soda containing 10 pounds of NaOH. The mass is heated to drive off the water of solution. Any petroleum solvent distilled during these operations is returned to the vessel. Thereafter, with the temperature at approximately 150° C., 327 pounds of propylene oxide are slowly introduced in small increments, and reacted, reaction pressure being maintained below about 20 p.s.i.g. Then, to the mass 248 pounds of ethylene oxide are similarly introduced and reacted. Introduce 1,000 parts by weight of this product into a processing vessel equipped with stirring and heating facilities, and add 100 parts by weight of diglycolic acid, in small increments and with stirring, starting the addition at about 100° C. and slowly raising the temperature to about 150° C. Stir the mass at this latter temperature for about 2 hours, stopping the operation at the first signs of the formation of rubbery polymers. Care must be taken throughout the preparation of this finished product to avoid excessive processing conditions, as such useless rubbery polymers appear to form readily. The product is an effective oil-in-water demulsifier.

Example 9

Example 6 is repeated, but substituting 736 pounds of para-nonylphenol for the 502 pounds of butylphenol used in the earlier example. Otherwise the procedure is as there described. Introduce 1,000 parts by weight of this product into a processing vessel equipped with stirring and heating facilities, and add 94 parts by weight of oxalic acid, in small increments and with stirring, starting the addition at about 100° C. and slowly raising the temperature to about 200° C. Stir the mass at this latter temperature for 2 hours. The product is an effective oil-in-water demulsifier.

Example 10

Example 6 is repeated but using 977 pounds of tetradecylphenol instead of the 502 pounds of butylphenol used in the earlier example. Otherwise the procedure is as there described. Introduce 1,000 parts by weight of this product into a processing vessel equipped with stirring and heating facilities, and add 108 parts by weight of azelaic acid, in small increments and with stirring, starting the addition at about 100° C. and slowly raising the temperature to about 150° C. Stir the mass at this latter temperature for 2 hours. The product is an effective oil-in-water demulsifier.

Example 11

Example 6 is repeated but using 689 pounds of octylphenol instead of the 502 pounds of butylphenol used in the earlier example. Otherwise the procedure is as there described. Introduce 1,000 parts by weight of this product into a processing vessel equipped with stirring and heating facilities, and add 115 parts by weight of sebacic acid, in small increments and with stirring, starting the addition at about 100° C. and slowly raising the temperature to about 200° C. Stir the mass at this latter temperature for 2 hours. The product is an effective oil-in-water demulsifier.

Example 12

Example 3 is repeated but using 642 pounds of octylphenol instead of the 511 pounds of amylphenol and 413 pounds of ethylene oxide instead of the 329 pounds of ethylene oxide used in the earlier example. Otherwise the procedure is as there described. Introduce 1,000 parts by weight of this product into a processing vessel equipped with stirring and heating facilities, and add 220 parts by weight of commercial dimerized fatty acid (of the kind marketed by the Rohm & Haas Company under the designation "VR-1 Acids"), in small increments and with stirring, starting the addition at about 100° C. and slowly raising the temperature to about 225° C. Stir the mass at this latter temperature for about 5 hours. (Inclusion of a small proportion of acid catalyst, such as p-toluenesulfonic acid, will appreciably accelerate the esterification process.) The product is an effective oil-in-water demulsifier.

Example 13

Example 6 is repeated; but the resin is prepared using 147 pounds of acetaldehyde instead of the 271 pounds of commercial formaldehyde used in the earlier example. Otherwise the procedure is essentially as described therein. Introduce 1,000 parts by weight of this product into a processing vessel equipped with stirring and heating facilities, and add 100 parts by weight of maleic anhydride, in small increments and with stirring, starting the addition at about 100° C. and slowly raising the temperature to about 150° C. Stir the mass at this latter temperature for 2 hours, watching carefully throughout the operation for the first appearance of rubbery particles of undesired polymer, which are to be avoided by operating at minimum conditions. The product is an effective oil-in-water demulsifier.

Example 14

Example 6 is repeated; but the resin is prepared using 321 pounds of furfuraldehyde instead of the 271 pounds of commercial formaldehyde used in the earlier example. Otherwise the procedure is essentially as described therein. Introduce 1,000 parts by weight of this product into a processing vessel equipped with stirring and heating facilities, and add 138 parts by weight of phthalic anhydride, in small increments and with stirring, starting the addition at about 100° C. and slowly raising the temperature to about 200° C. Stir the mass at this latter temperature for 2 hours. The product is an effective oil-in-water demulsifier.

Example 15

Example 6 is repeated; but the resin is prepared using 355 pounds of benzaldehyde instead of the 271 pounds of commercial formaldehyde used in the earlier example. Otherwise the procedure is essentially as described therein. Introduce 1,000 parts by weight of this product into a processing vessel equipped with stirring and heating facilities, and add 109 parts by weight of adipic acid, in small increments and with stirring, starting the addition at about 100° C. and slowly raising the temperature to about 200° C. Stir the mass at this latter temperature for 2 hours. The product is an effective oil-in-water demulsifier.

Example 16

Example 6 is repeated; but the resin is prepared using 382 pounds of heptaldehyde instead of the 271 pounds of commercial formaldehyde used in the earlier example. Otherwise the procedure is essentially as described therein. Introduce 1,000 parts by weight of this product into a processing vessel equipped with stirring and heating facilities, and add 87 parts by weight of fumaric acid, in small increments and with stirring, starting the addition at about 100° C. and slowly raising the temperature to about 200° C. Stir the mass at this latter temperature for 2 hours. The product is an effective oil-in-water demulsifier.

We prefer that the oxyalkylated derivatives included in this resin-derived sub-genus contain at least 2 alkylene oxide residues for each phenolic residue, on a statistical basis. They may of course contain more than 100 or even 200 such alkylene oxide residues, in some cases.

Note that in each of the foregoing examples an alkylphenol is used as a starting material. These alkylphenols all have 6 carbon atoms in the benzene ring, plus from 4 to 14 carbon atoms in the hydrocarbon sidechain. In all instances, therefore, the finished products possess more than the required minimum of 8 carbon atoms in a single group (attached to the OH group which reacts with the alkylene oxide).

The exact size of the molecules of the resins so prepared is not known. However, it appears that, at very least, they would range from about 3 resin units (phenolic residue plus methylene bridge) to about 7 such units. On this basis, it is readily calculable that the present oxyalkylated derivatives of such a resin will have molecular weights of at least about 1,000. Extensively oxyalkylated derivatives will of course have molecular weights much higher than this, up to 10,000 or greater.

Other examples of oxyalkylated derivatives suitable for use in our process and which contain radicals having at least 8 carbon atoms in a single group are as follows:

Example 17

Dodecyl alcohol, 186 pounds, is reacted with 1320 pounds of ethylene oxide at approximately 150° C., in the presence of 10 pounds of NaOH catalyst, reaction pressure being maintained below about 20 p.s.i.g. Such oxyalkylation procedure is conventional and needs no further description. Introduce 1,000 parts by weight of this product into a processing vessel equipped with stirring and heating facilities, and add 138 parts by weight of phthalic anhydride, in small increments and with stirring, starting the addition at about 100° C. and slowly raising the temperature to about 150° C. Stir the mass at this latter temperature for 2 hours. The product is an effective oil-in-water demulsifier.

Example 18

Nonylphenol, 220 pounds, is reacted with 1740 pounds of propylene oxide, then with 440 pounds of ethylene oxide, at approximately 150° C., in the presence of 30 pounds of NaOH catalyst, reaction pressure being maintained below about 20 p.s.i.g. The procedure is conventional and requires no further description. Introduce 1,000 parts by weight of this product into a processing vessel equipped with stirring and heating facilities, and add 100 parts by weight of 3-bromophthalic acid, in small increments and with stirring, starting the addition at about 100° C. and slowly raising the temperature to about 200° C. Stir the mass at this latter temperature for 2 hours. The product is an effective oil-in-water demulsifier.

Example 19

Introduce 154 pounds of alpha-terpineol into a conventional autoclave, and add 5 pounds of NaOH as a dilute aqueous solution. Heat to drive off the water of solution. Then purge the autoclave with nitrogen, and introduce propylene oxide in a small continuous stream, using a temperature of about 110–120° C., and maintaining the pressure at about 20 p.s.i.g. or less. A total of 1,160 pounds of propylene oxide is so reacted with the terpineol. Introduce 1,000 parts by weight of this product into a processing vessel equipped with stirring and heating facilities, and add 150 parts by weight of diglycolic acid, in small increments and with stirring, starting the addition at about 100° C. and slowly raising the temperature to about 200° C. Stir the mass at this latter temperature for 2 hours. The product is an effective oil-in-water demulsifier.

Example 20

Prepare oxypropylated alpha-terpineol as in Example 19 above. To the product so prepared, and without removing it from the autoclave, introduce 440 pounds of ethylene oxide, conducting the reaction under the same conditions as there described. Introduce 1,000 parts by weight of the oxyethylated, oxypropylated terpineol into a processing vessel equipped with stirring and heating facilities, and add 50 parts by weight of maleic anhydride, in small increments and with stirring, starting the addition at about 100° C. and raising the temperature slowly to about 175° C. Stir the mass at this latter temperature for 1 hour. The product is an effective oil-in-water demulsifier.

Example 21

Substitute 150 pounds of commercial pine oil for the 154 pounds of terpineol used in Examples 19 and 20 above. Otherwise, conduct the oxyalkylation reactions as therein described. Introduce 1,000 parts by weight of the oxyalkylated product so prepared into a processing vessel equipped with stirring and heating facilities, and add 100 parts by weight of diglycolic acid, in small increments with stirring, starting the addition at about 100° C. and raising the temperature slowly to about 200° C. Stir the mass at this latter temperature for 2 hours. The product is an effective oil-in-water demulsifier.

Where the oxyalkylated derivative used in the esterification process possesses only one OH group, the product can be an acidic ester containing the residues of one molecule of each kind of reactant, or a neutral ester containing the residues of one molecule of dicarboxy acid and 2 molecules of oxyalkylated derivative. Where the parent oxyalkylated derivative contains more than one OH group, it is obvious that poly-esters will result on continued reaction; and that such poly-esters may be either neutral or acidic, depending on the nature of their terminal groups. In turn, that is determined largely by the proportions of reactants employed.

We prefer to use the acidic fractional esters of this kind, as demulsifiers in our process. Accordingly, we prefer that the esters be prepared using a stoichiometric excess of the polycarboxy acid, over what would be required to produce a neutral ester.

U.S. Patent No. 2,766,213, dated October 9, 1956, to Dickson, describes reagents of this class of esters which we find useful as demulsifiers for some oil-in-water emulsions. That description is incorporated herein by reference. As a specific preferred example of our present class of esters, the following is recited.

Example 22

Charge into an autoclave 177 pounds of a conventional para amylphenol-formaldehyde resin, such as that of Example 3a of U.S. Patent No. 2,499,370, dated March 7, 1950, to De Groote, or as prepared in Example 3 above. Add 177 pounds of xylene, and 5 pounds of sodium hydroxide catalyst (as a 50% aqueous solution). Heat to distill the water so introduced. Seal the autoclave, purge with nitrogen, and, maintaining a temperature of about 125–130° C., introduce 4,640 pounds of propylene oxide. The oxide is fed continuously to the vessel, as rapidly as the resin will accept it without forcing the pressure above about 50 p.s.i.g. (If the reaction rate slows too greatly, additional catalyst may be added. Acceptance of the oxide is reduced as the addition proceeds.) To the product, in the same vessel and under the same operating conditions, ethylene oxide is introduced until a total of 660 pounds have been so reacted.

Using the esterification techniques described in the foregoing Dickson patent, No. 2,766,213, the ester of the above oxyalkylated resin is prepared. Specifically, introduce 1,000 pounds of the oxyalkylated resin into a reflux-distillation apparatus, and add 100 pounds of commercial diglycolic acid. Heat the mixture to 225° C., with stirring, and collect the water (and the trace of xylene) which distills. Stop the esterification reaction when no more water distills. The product is diluted with aromatic petroleum solvent, to reduce its viscosity and to settle any traces of crystalline salts present. The product is an effective oil-in-water demulsifier.

Reference is made to U.S. Patent No. 2,562,878, dated August 7, 1951, to Blair. Although the esters with which said Blair patent is concerned are not the same as those prepared by the foregoing examples, said patent still is pertinent here because of the discussion of poly-esters it presents.

We prefer to employ such proportions of polycarboxy acid and oxyalkylated derivative of the present kind that there are present from about 1.1 to about 2.0 equivalents of carboxyl group for each equivalent of hydroxyl group taking part in the esterification reaction.

Our demulsifier may be applied in concentrated form, or it may be diluted with a suitable solvent. Water has frequently been found to constitute a satisfactory solvent, because of its ready availability and negligible cost; but in other cases non-aqueous solvents, such as aromatic petroleum solvent, have been employed in preparing reagents which are effective when used for the purpose of resolving oil-in-water emulsions. Because such reagents are frequently effective in proportions of the order of 10 to 50 parts per million, their solubility in the emulsion mixture may be entirely different from their apparent solubility in bulk, in water or oil. Undoubtedly, they have some solubility in both media, within the concentration range employed.

It should be pointed out that the superiority of the reagent contemplated in the present process is based upon its ability to separate the oil phase from certain oil-in-water class emulsions more advantageously and at lower cost than is possible with other reagents or other processes. In some cases, it is capable of resolving emulsions which are not economically or effectively resolvable by any other known means.

While heat is often of little value in improving results when the present process is practised, still there are instances where the application of heat is distinctly of benefit. In some instances, adjustment of the pH of the emulsion, to an experimentally determinable optimum value, will materially improve the results obtained in applying the present process.

In operating the present process to resolve an oil-in-water emulsion, the reagent is introduced at any convenient point in the system, and it is mixed with the emulsion in any desired manner, such as by being pumped or circulated through the system or by mechanical agitation such as paddles, or by gas agitation. After mixing, the mixture of emulsion and reagent is allowed to stand quiescent until the constituent phases of the emulsion separate. Settling times and optimum mixing times will, of course, vary with the nature of the emulsions and the apparatus available. The operation, in its broadest concept, is simply the introduction of the reagent into the emulsion, the mixing of the two to establish contact and promote coalescence, and, usually, the subsequent quiescent settling of the agitated mixture, to produce the aqueous and non-aqueous emulsion phases as stratified layers.

Agitation may be achieved in various ways. The piping system through which the emulsion is passed during processing may itself supply sufficient turbulence to achieve adequate mixing of reagent and emulsion. Baffled pipe may be inserted in the flow sheet to provide agitation. Other devices such as perforated-chamber mixers, excelsior- or mineral- or gravel- or steel-shaving-packed tanks, beds of stones or gravel or minerals in open ducts or trenches may be employed beneficially to provide mixing. The introduction of a gas, such as natural gas or air, into a tank or pipe in which or through which the mixture of reagent and emulsion is standing or passing is frequently found suitable to provide desired agitation.

It has been found that the factors, reagent feed rate, agitation, and settling time are somewhat interrelated. For example, with sufficient agitation of proper intensity the settling time required can be materially shortened. On the other hand, if agitation is relatively non-procurable but extended settling time is, the process may be equally productive of satisfactory results. The reagent feed rate has an optimum range, which is sufficiently wide, however, to meet the tolerances required for the variances encountered daily in commercial operations.

Application of a suitable gas in a procedure approximating that of the froth flotation cell employed in ore beneficiation, after the present reagent has been added to the emulsion to be resolved, frequently has a favorable influence of totally unexpected magnitude. By incorporating the step of subjecting the chemicalized emulsion to the action of air in a sub-aeration type flotation cell, a clear aqueous layer is sometimes obtained in a matter of seconds, without added quiescent settling, and with approximately as much reagent. Natural gas was found to be as good a gaseous medium as was air, in this operation.

It should be distinctly understood that such aeration technique, while an important adjunct to the use of the present reagent, in some cases, is not an equivalent procedure. This may be proved by subjecting an un-chemicalized emulsion to aeration for a period of minutes without detectable favorable effect. Addition of the reagent to such aerated emulsion will produce resolution, promptly.

The details of the mechanical structures required to produce aeration suitable for the present purpose need not be given here. It is sufficient to state that any means capable of producing small gas bubbles within the body of the emulsion is acceptable for use.

The flotation principle has long been employed in the beneficiation of ores. Many patents in this art illustrate apparatus suitable for producing aeration of liquids. Reference is made to Taggart's "Handbook of Ore Dressing," which describes a large number of such devices.

The principle of aeration has been applied to the resolution of emulsions by Broadbridge, in U.S. Patent No. 1,505,944, and Bailey, in U.S. Patent No. 1,770,476. Neither of these patents discloses or suggests the present invention, as may be seen from an inspection of their contents.

Suitable aeration is sometimes obtainable by use of the principle of Elmore, U.S. Patent No. 826,411. In that ore beneficiation process, an ore pulp was passed through a vacuum apparatus, the application of vacuum liberating very small gas bubbles from solution in the water of the pulp, to float the mineral. A more recent application of this same principle is found in the Dorr "Vacuator."

The manner of practicing the present invention using aeration is clear from the foregoing description.

The order in which the reagent and the aeration step are applied is relatively immaterial. Sometimes it is more convenient to chemicalize the emulsion and subsequently to apply the aeration technique. In others, it may be more advantageous to produce a strongly frothing emulsion and then introduce the reagent into such aerated emulsion.

As stated previously, any desired gas can be substituted for air. Other commonly suitable gases include natural gas, nitrogen, carbon dioxide, oxygen, etc., the gas being used essentially for its levitation effect. If any gas has some deleterious effect on any component of the emulsion, it will be obviously be desirable to use instead some other gas which is inert under the conditions of use.

In summary of the foregoing: We employ as demulsifiers for oil-in-water emulsions certain esters of polycarboxy acids and a high-molal non-ionic surfactant, which surfactant is a water-dispersible oxyalkylated derivative of an oxyalkylation-susceptible starting material. These have molecular weights between about 1,000 and about 10,000. We prefer to employ here the esters of those members of this broad class as are derived by the oxyalkylation of a resin, which resin in turn is prepared from a 2,4,6 $C_4$-to-$C_{14}$-hydrocarbon-substituted monocyclic phenol and a $C_1$-to-$C_8$ aldehyde, the oxyalkylene groups present in the finished reagent being selected from the class consisting of oxyethylene, oxypropylene, oxybutylene, hydroxypropylene, and hydroxybutylene.

By "2,4,6-substituted," we mean the difunctional phenol has a substituent group of the described kind, located in either the 2-position, the 4-position, or the 6-position of the aromatic ring. Of these 3 originally reactive positions, therefore, 2 are still reactive; and the phenol is therefore difunctional. As an example of our preferred reagent we cite the product of Example 22 above.

Our reagents may be employed alone, or they may in some instances be advantageously employed admixed with other and compatible oil-in-water demulsifiers. Specifically, we have employed them to advantage with the reagents described in U.S. Patent No. 2,470,829, dated May 24, 1949, to Monson.

Our process is commonly practised simply by introducing small proportions of our reagent into an oil-in-water class emulsion, agitating to secure distribution of the reagent and incipient coalescence, and letting the mixture stand until the oil phase separates. The proportion of reagent required will vary with the character of the emulsion to be resolved. Ordinarily, proportions of reagent required are from about 1/10,000 to about 1/1,000,000 the volume of emulsion treated; but more or less may be required.

A preferred method of practising the process to resolve a petroleum oil-in-water emulsion is as follows: Flow the oil well fluids, consisting of free oil, oil-in-water emulsion, and natural gas, through a conventional gas separator, then to a conventional steel oil-field tank, of, for example, 5,000-bbl. capacity. In this tank the oil-in-water emulsion falls to the bottom, is withdrawn, and is so separated from the free oil. The oil-in-water emulsion, so withdrawn, is subjected to the action of our reagent in the desired small proportion, injection of reagent into the stream of oil-in-water emulsion being accomplished by means of a conventional proportioning pump or chemical feeder. The proportion employed in any instance is determined by trial-and-error. The mixture of emulsion and reagent then flows to a pond or sump wherein it remains quiescent and the previously emulsified oil separates, rises to the surface, and is removed. The separated water, containing relatively little to substantially none of the previously emulsified oil, is thereafter discarded.

The following will illustrate the operating steps employed to resolve an emulsion of the oil-in-water class by use of a reagent of the present kind.

A natural crude petroleum oil-in-water emulsion is subjected to the action of the product of Example 22 above. The mixture of emulsion and demulsifier is agitated for 2 minutes at 130 shakes per minute, and then allowed to stand quiescent. Separation is nearly complete after 18 hours. A check or control sample, processed the same way except that no reagent is added to it, is still brown-colored emulsion at the end of this period.

Throughout the foregoing description, we have referred to "oil" and to "water." By "oil" we mean any oily, non-aqueous liquid which is not soluble in or miscible with water. By "water" we mean water, aqueous solutions, and any non-oily liquid which is not soluble in or miscible with oils.

We claim:

1. A process for breaking an emulsion comprising an oil dispersed in a non-oily continuous phase, in which the dispersed phase is not greater than about 20%, characterized by subjecting the emulsion to the action of a reagent which includes the ester of a polycarboxy acid and a high-molal non-ionic surfactant which is an oxyalkylated derivative produced by reaction between a 2,4,6-$C_4$-to-$C_{14}$-hydrocarbon-substituted monocyclic phenol-$C_1$-to-$C_8$ aldehyde resin and an alkylene oxide having from 2 to 4 carbon atoms selected from the class consisting of ethylene oxide, propylene oxide, butylene oxide, glycide and methylglycide, the molecular weight of the oxyalkylated derivative being within the range of about 1,000 to about 10,000.

2. A process as in claim 1, in which the emulsion is a petroleum oil-in-water emulsion.

3. A process as in claim 2, in which the oxyalkylated derivative is produced by reaction between the parent resin and both ethylene oxide and propylene oxide.

4. A process as in claim 3, in which the polycarboxy acid contains not more than 8 carbon atoms.

5. The process of claim 4, wherein the polybasic acid is diglycolic acid.

6. The process of claim 4, wherein the polybasic acid is maleic acid.

7. The process of claim 4, wherein the polybasic acid is phthalic anhydride.

8. A process as in claim 4, wherein the oxyalkylated derivative is produced from an alkylphenol-formaldehyde resin.

9. A process as in claim 4, wherein the oxyalkylated derivative is produced from an amylphenol-formaldehyde resin.

10. A process as in claim 4, wherein the oxyalkylated derivative is produced from a butylphenol-formaldehyde resin.

References Cited in the file of this patent

UNITED STATES PATENTS

| | | |
|---|---|---|
| 2,159,313 | Blair et al. | May 23, 1939 |
| 2,454,451 | Bock et al. | Nov. 23, 1948 |
| 2,514,399 | Kirkpatrick et al. | July 11, 1950 |
| 2,568,744 | Kocher | Sept. 25, 1951 |
| 2,607,750 | Wilson et al. | Aug. 19, 1952 |
| 2,626,937 | De Groote | Jan. 27, 1953 |
| 2,759,607 | Boyd et al. | Aug. 21, 1956 |
| 2,881,204 | Kirkpatrick | Apr. 7, 1959 |

FOREIGN PATENTS

| | | |
|---|---|---|
| 1,009,208 | France | Mar. 5, 1952 |

OTHER REFERENCES

Schweitzer: The Creaming of Rubber Latex, article in Rubber Chemistry and Technology, vol. 13, pp. 408 to 414 (especially p. 412, last full paragraph), 1940.

Ucon Fluids and Lubricants, Pamphlet pub. 1955, 1956, by Carbide and Carbon Chemicals Co. of New York, pp. 24 and 36.